W. B. MYERS.
Corn Planter.
No. 106,500. Patented Aug. 16, 1870.
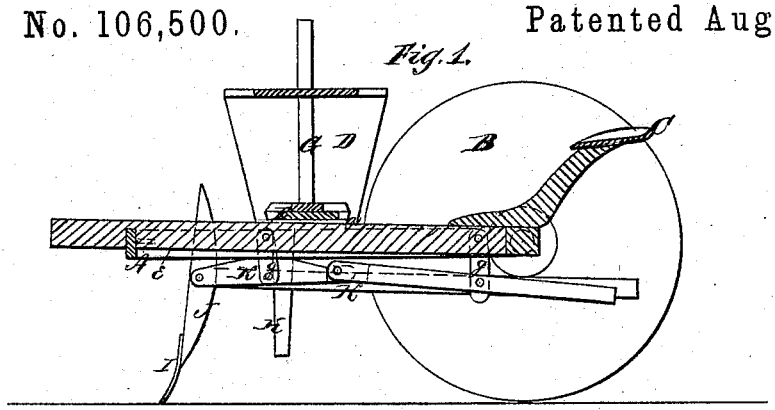
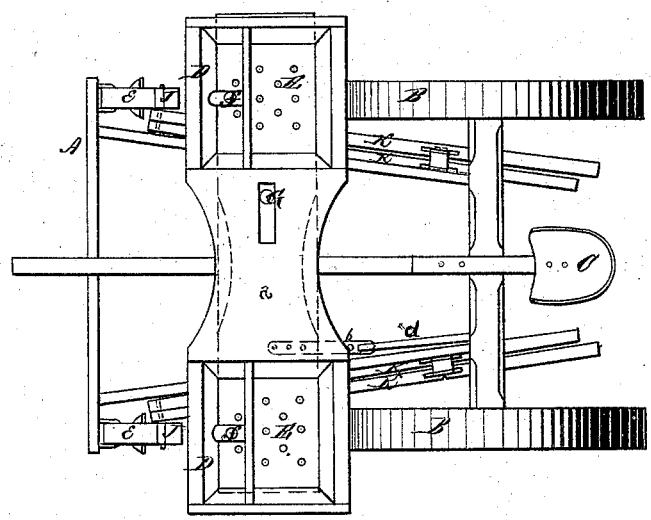
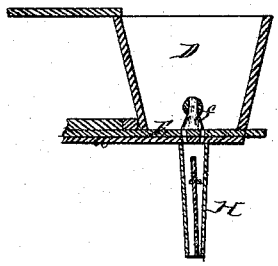
Witnesses
Jno. A. Ellis
J. W. White
Inventor
Washington B. Myers,
Per
T. H. Alexander
Atty

United States Patent Office.

WASHINGTON B. MYERS, OF HAMPTON, PENNSYLVANIA.

Letters Patent No. 106,500, dated August 16, 1870.

IMPROVEMENT IN SEEDERS AND FERTILIZERS COMBINED.

The Schedule referred to in these Letters Patent and making part of the same.

*To all whom it may concern:*

Be it known that I, WASHINGTON B. MYERS, of Hampton, in the county of Adams and State of Pennsylvania, have invented certain new and useful Improvements in Seeders and Fertilizers Combined; and I do hereby declare that the following is a full, clear, and exact description thereof, reference being had to the accompanying drawings and to the letters of reference marked thereon, which form a part of this specification.

The nature of my invention consists in the construction and arrangement of a "combined corn-planter and fertilizer-distributer," as will be hereinafter fully set forth.

In order to enable others skilled in the art to which my invention appertains to make and use the same, I will now proceed to describe its construction and operation, referring to the annexed drawings, in which—

Figure 1 is a longitudinal vertical section;
Figure 2 is a plan view; and
Figure 3 is a cross-section of the hopper.

A represents the frame of my machine, mounted upon two wheels, B B, the driver's seat C being supported on the center of the axle.

The two hoppers D D are connected at the bottom by a board, *a*, which is pivoted on the center beam of the frame A.

From this board a bar, *b*, extends toward the rear, which bar is perforated with a series of holes, for the insertion of a spring hook, *d*, attached to the axle of the machine.

The object of this hook is not only to hold the hoppers in their proper position, but also to change the hoppers out of square, as will be often necessary in finishing a field not square—the headland, for instance.

The hoppers D D are each divided into two compartments, one for corn or other grain, and the other for the fertilizer.

The bottoms of the fertilizer-compartments are perforated with any desired number of holes, while the corn-compartments have only one opening each.

Above the opening in the corn-box is placed a brush, *f*, which operates on top of the slide E, said slide passing through both the hoppers.

The slide E is suitably perforated, to correspond with the perforations in the bottoms of the hoppers, and is operated by means of the lever G, to plant the corn and distribute the fertilizer at the same time.

Under the apertures through which the corn is dropped are spouts, H, to conduct the corn into the furrow made by the plows I I.

These plows are, as usual, attached to shanks, J J, and said shanks are, on their front sides, provided with projections or arms, *e e*, which are hinged or pivoted to the frame A in front of the spouts H H.

Two levers, K K', are pivoted, by one bolt or pivot, to each plow-shank J, the lever K being also pivoted to a bar, *g*, projecting downward from the frame of the machine.

The lever K' is what is called a broken lever—that is, consisting of two pieces pivoted together at the ends in one line. The piece of this lever nearest to the plow-shank is also pivoted to a bar projecting from the frame, and the other piece of the broken lever is, in like manner, pivoted to a bar from the frame of the machine.

By this arrangement, the plows I I can readily be adjusted to run deep or shallow, as may be desired, the rear ends of the levers K K' being within reach of the driver from his seat.

Having thus fully described my invention,

What I claim as new, and desire to secure by Letters Patent, is—

1. The hoppers D D, connected as described, and rendered adjustable by spring hook *d* and perforated bar *b*, substantially as and for the purpose set forth.

2. The arrangement of the frame A, hoppers D D, slide E, spouts H H, plow-shanks J J, and levers K K', all constructed as described, to operate substantially in the manner and for the purposes herein set forth.

In testimony that I claim the foregoing as my own, I affix my signature in presence of two witnesses.

WASHINGTON B. MYERS.

Witnesses:
DANIEL S. CHRONISTER,
JOHN HENRY MYERS.